PHONOGRAPH

Filed June 7, 1962 3 Sheets-Sheet 1

INVENTOR.
Fred D. Lasswell, Jr.
BY
Snow and Benno
Attys.

PHONOGRAPH

Filed June 7, 1962 3 Sheets-Sheet 2

INVENTOR.
Fred D. Lasswell, Jr.
By:
Snow and Benno
Attys

INVENTOR.
Fred D. Lasswell, Jr.
BY
Snow and Benno
Attys.

3,181,870
Patented May 4, 1965

3,181,870

PHONOGRAPH

Fred D. Lasswell, Jr., 329 Bayshore Blvd., Tampa, Fla.

Filed June 7, 1962, Ser. No. 200,810
16 Claims. (Cl. 274—9)

This invention relates generally to phonographs, and more particularly to a novel compact phonograph arrangement which is carried for rotation on top of a phonograph record.

The primary object of the present invention is to provide a novel phonograph construction wherein the phonograph record remains stationary and the entire phonograph is carried on top of the phonograph record and rotates thereabout.

Another important object of this invention is to supply an arm structure with the elements of a phonograph and including means to rotate the arm structure about a stationary record to reproduce the recorded sound of the record.

Another object is to provide a novel compact portable phonograph arrangement which is easily placed upon a stationary phonograph record for reproducing the recorded sound of the record.

It is a further object to provide a novel phonograph construction according to the preceding paragraph wherein the power supply, the speaker system, and the amplifier are all arranged in a unitary assembly with the other parts of the phonograph for rotation therewith about a vertical axis through the center of the phonograph record.

It is still another object to provide novel means in a phonograph according to any of the preceding paragraphs for adjusting the reproducing speed of the phonograph.

Another and still further important object of this invention is the provision of a record playing arm structure adapted to be journally supported at the center of a stationary record and having driven wheel means at the other end of the arm structure for engaging a stationary surface adjacent the periphery of the stationary record to be played, and the arm structure including a power source, a motor driven by the power source and adapted to drive the wheel means, an amplifier, a speaker system and a record engaging tone arm hinged on said arm structure, and upon rotation of said arm structure the recorded sound on the stationary record is reproduced.

Other important objects and features of the invention will become apparent upon a perusal of the following specification and drawings in which.

Figure 1:
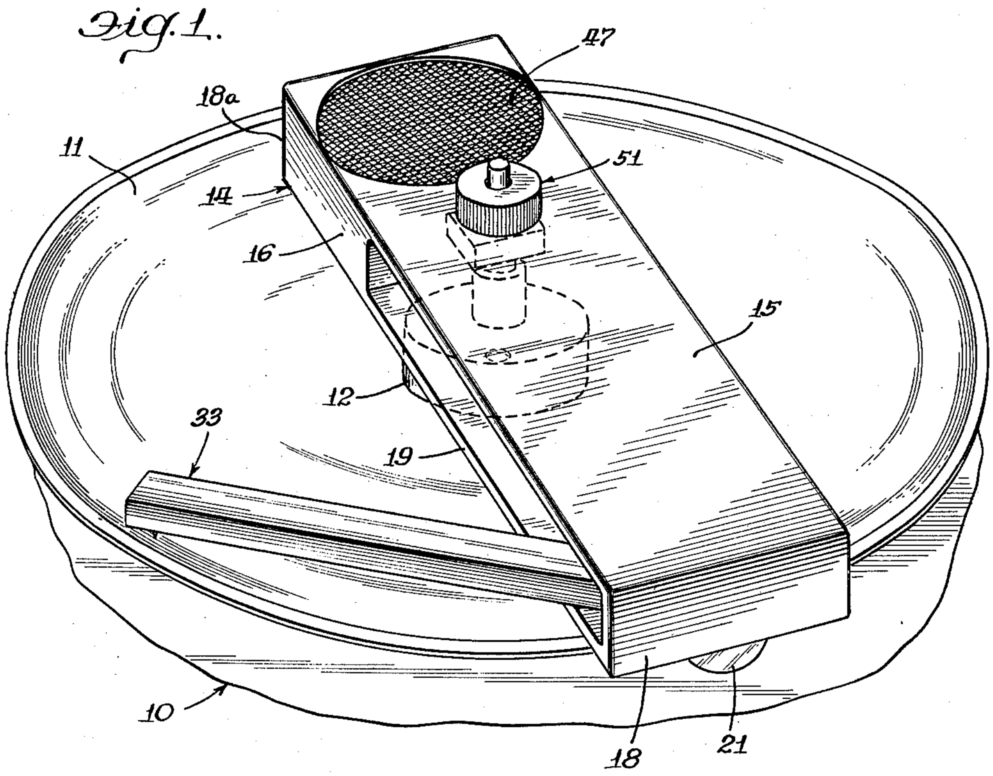
FIGURE 1 is a perspective view of a phonograph construction according to the present invention and shown on a phonograph record.
Figure 3:
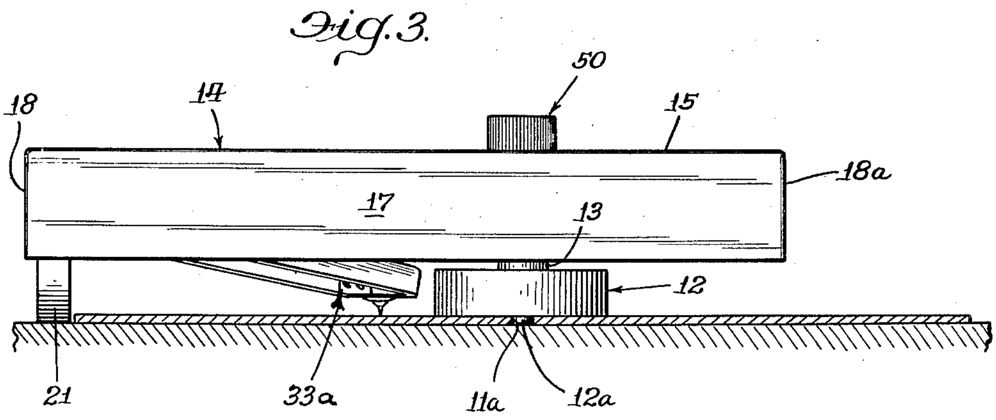
FIGURE 3 is a side elevational view, partially in section of the phonograph construction.

The present embodiment is the preferred embodiment, but it is to be understood that changes can be made in the present embodiment by one skilled in the art without departing from the spirit and scope of the present invention.

Generally, the construction of the present embodiment comprises a rectangular case or arm structure which is carried on the center of a phonograph record and extends over the record with one end of the case carrying a drive wheel which engages the surface upon which the phonograph record is carried outwardly of the periphery of the record. The armlike housing or case of the phonograph is supported on the record by a circular base member having a central upstanding post and a downwardly projecting pilot pin. The case of the phonograph carries a power supply comprising a plurality of batteries, a speaker, an audio amplifying system, a switch and volume control, a tone arm, a drive motor and a drive wheel. The power supply, speaker and audio amplifying system may be of any suitable type known in the art. The tone arm is pivotally carried at one end thereof on the outer end of the phonograph case and the other end of the tone arm carries a cartridge for translating the groove variations of the phonograph record into an electrical signal. The drive motor and drive wheel uniquely determine the operation of the phonograph by an arrangement wherein the operating speed of the phonograph is a function of the radial position of the drive wheel from the axis of rotation of the phonograph. The speed of the drive motor and the diameter of the drive wheel are selected so that for a certain desired phonograph speed, such for example, as 33⅓ r.p.m., which is a large diameter record, the drive wheel in engaging the surface on which the phonograph record is carried immediately outwardly of the periphery of the record will cause the phonograph to be rotated over the upper surface of the record at that selected speed. When the phonograph is used with a smaller diameter-higher speed record, such for example as a 45 r.p.m. record, the drive motor and drive wheel are slidable inwardly of the outer end of the phonograph to a predetermined position which, due to the smaller circumference of the circle upon which the drive wheel will then track, will cause a rotation of the phonograph at that selected high speed.

In detail, the present embodiment is intended for use on a relatively flat substantially horizontally disposed surface 10. A phonograph record 11 is carried on the surface 10 in frictional contact therewith. The phonograph arrangement is carried on a base member 12 which in turn is carried on a relatively small circular area at the center of the record 11. That area is normally the label carrying area of the record. The base 12 comprises a disc having a post member of sleeve 13 secured at the center thereof to upstand therefrom. The underside of the base 12 below the sleeve 13 carries a depending pin member 12*a* for piloting the base 12 within the center opening 11*a* of the record 11.

The case or housing 14 is rectangularly shaped and comprises a top wall 15, a pair of side walls 16 and 17 and a pair of end walls 18 and 18*a*. The underside of the case 14 is preferably provided with a partial bottom wall 19. The underside of the case 14 is provided with a depending rod member 20 which is journaled in the upper end of the sleeve 13 to freely rotatively carry the case 14 on the base 12. The depending rod member 20 is positioned intermediate the ends and side walls of the case 14 and substantially nearer to the end wall 18*a* than the end 18. The end 18 of the case 14 farthest from the depending rod member 20 is supported on and above the surface 10 by a drive wheel 21.

The drive wheel 21 is journaled on a shaft 22 which is disposed generally longitudinally of the case 14. The shaft 22 is carried on a frame 23. The frame 23 is slidably carried in four tracks 24, 24*a*, 24*b* and 25. The frame structure 23 comprises two substantially identically shaped frame members, respectively an upper frame member 26 and a lower frame member 27. The frame member 26 comprises a central curved portion between two extending end portions which have upwardly turned end flanges 26a. The frame member 27 comprises a central complementary curved portion between two extending end portions, the extreme ends of which are turned downwardly to form end flanges 27a. A constant speed drive motor 28 is carried by the frame 23 between the complementary curved portions of the upper frame member 26 and the lower frame member 27. A drive pinion 30 extends axially from one end of the motor 28. The frame members 26 and 27 may be secured to the drive motor 28 by any suitable means. The tracks 24 and 25 are carried within the furthest extending end 18 of the case 14 and are aligned along axes parallel to the longitudinal axis of the case 14. The tracks 24 and 25 are substantially U-shaped in cross section, and one pair of tracks 24 and 24a is secured in an opposing and spaced relationship to each other on the inner vertical wall of the walled section 32 of the case 14. The walled section 32 is provided for storage of a tone arm 33 and is integrally formed over an opening through the side wall 16 and above the partial bottom 19 of the case 14. The other tracks 24b and 25 are carried in an opposed and spaced apart relationship to each other on the inner side of the side wall 17 of the case 14. The downwardly turned flanges 27a at the ends of the lower frame member 27 are disposed in the laterally spaced apart lower channel shaped tracks 24 and 24b, and the upwardly turned flanges 26a of the upper frame member 26 are disposed in the laterally spaced apart upper channel shaped tracks 24a and 25. The upper and lower frame members 26 and 27 of the frame 23 may be formed of a resilient spring material so that the end flanges 26a and 27a, of the upper and lower frame members 26 and 27 respectively, are spring biased in the channel shaped tracks 24, 24a, 24b and 25.

The shaft 22 of the drive wheel 21, which is carried on the lower frame member 27 is further positioned so that the drive pinion 30 of the motor 28 drivingly engages the periphery of the drive wheel 21. The contact between the drive wheel 21 and the drive pinion 30 is further maintained by a tensioned spring 34 which is connected between the upper frame member 26 and the shaft 22 of the drive wheel 21.

From the foregoing it may be seen that the drive wheel 21 and drive motor 28 are slidable lengthwise in a horizontal plane including the case 14 and along a line parallel to the longitudinla axis of the case 14. The adjusted positions of the drive wheel 21 and drive motor 28 from the axis of the sleeve 13 are determined by two notches 35 and 36 and a spring detent 37. The notches 35 and 36 are formed in the track 25 at certain spaced positions. The spring detent 37 is secured to the upper frame member 26 of the frame 23 at a position to engage either of the spaced apart notches 35 or 36 dependent upon the position of the frame 23 in the tracks 24 and 25. The certain position of the notches 35 and 36 may easily be explained by an example. Assuming that the subject invention is to be used with phonograph records of the 33⅓ and 45 r.p.m. types, it is well known that the 33⅓ records are substantially greater in diameter than the 45 r.p.m. records and each of these types of records has a well known diameter. The position of the notch 36 is then selected as one which will cause the drive wheel 21 to rotate on the circumference of a circle having a diameter slightly greater than the diameter of a 33⅓ r.p.m. record and wherein that diameter is correlated to the speed of the drive wheel 21 as driven by the motor 28 to cause the arm structure or case 14 to be rotated about the axis of the sleeve 13 at a speed of 33⅓ r.p.m. When the diameter of the circle about which the drive wheel 21 rotates is reduced by sliding frame 23 in the tracks 24 and 25 toward the axis of rotation of the case 14, the rotational speed of the case 14 will be increased for a constant motor speed because of the rotation of the drive wheel 21 about the circumference of a smaller circle. The notch 35 is provided for 45 r.p.m. records, and when the spring detent 37 engages the notch 35 and the base 12 is placed on a 45 r.p.m. record, the drive wheel 21 will engage the surface 10 immediately radially outwardly of the periphery of the 45 r.p.m. record and will rotate the arm structure or case 14 at a speed of 45 r.p.m.

The motor 28 is operated from the power supply connected to the motor conductors 38. The power supply in the present embodiment comprises four dry cell type batteries 40 which are carried in pairs in the end 18a of the case 14 opposite from that carrying the motor 28 and the drive wheel 21. The power supply may comprise other types and numbers of power elements. The batteries 40 are connected in series by clips such as shown at 41. The clips 41 of the batteries 40 and the conductors 38 for the motor 28 are connected to a circuit board 42. The circuit board 42 is formed of an insulating material and is carried substantially longitudinally centrally of the case 14 and about the axis of rotation thereof. The circuit board 42 carries a number of electrical components such as condensors 43, resistors 44 and transistors 45. The various electrical components are connected to provide control circuit means and an audio amplifier of any suitable type. As is well known in the art, the audio amplifier will receive the electrical signals from the cartridge carried by the tone arm 33 and will amplify and transmit those signals to a speaker 46. The speaker 46 is carried in the case 14 between the spaced apart pairs of batteries 40 with the diaphragm of the speaker positioned beneath an opening in the upper wall 15 of the case 14. That opening is covered by a grill cloth 47 as shown in FIGURE 1.

Figure 2:
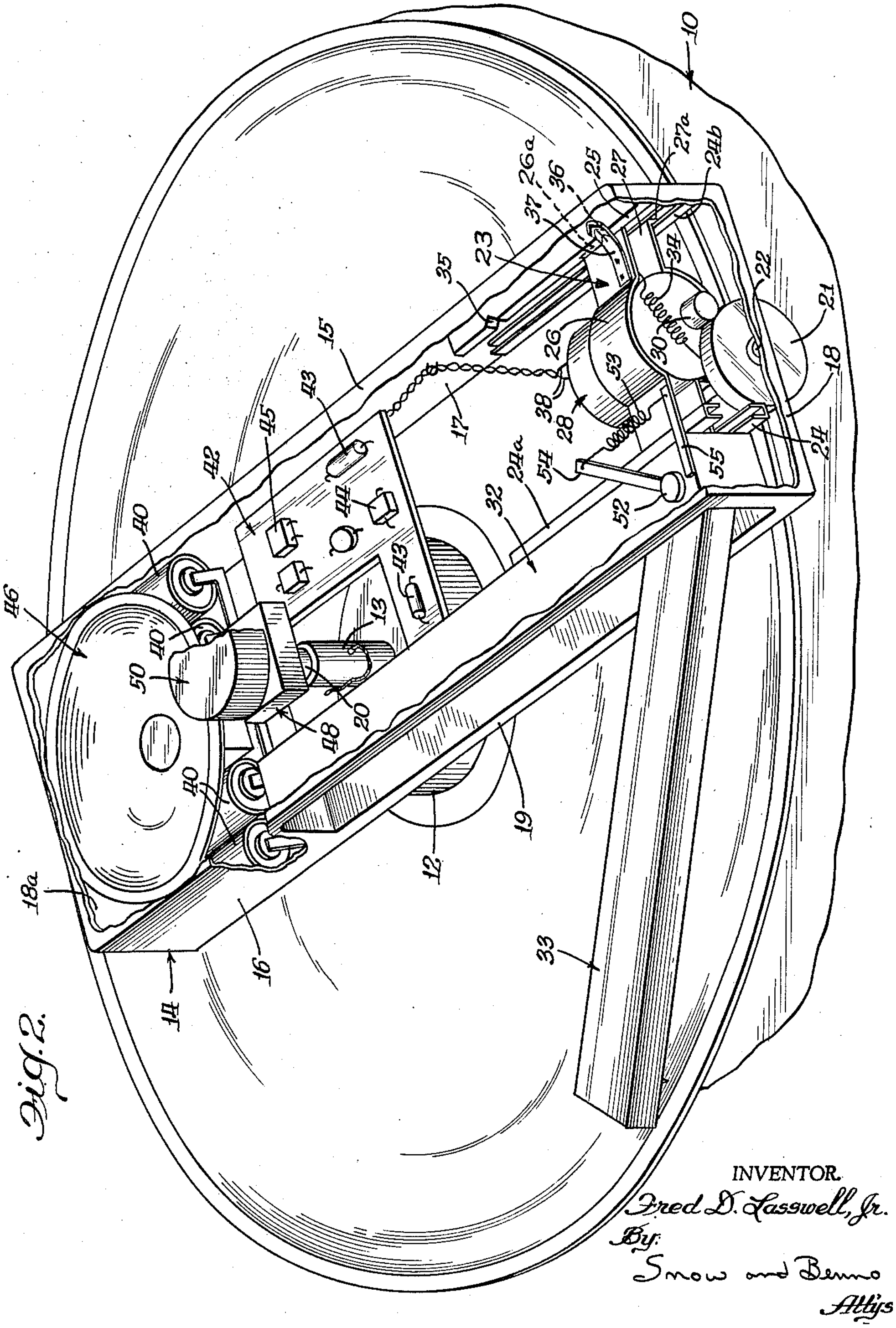
FIGURE 2 is a view similar to FIGURE 1 but with portions of the phonograph construction removed to show the internal arrangement and construction of the parts thereof.
Figure 4:
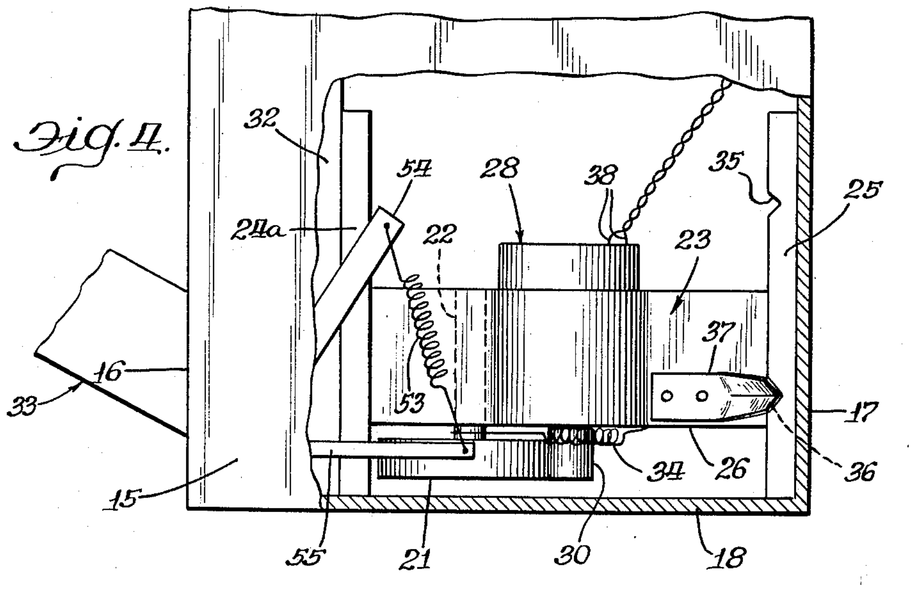
FIGURE 4 is an enlarged top plan view of the outer end of the phonograph construction with portions removed to show the drive means.
Figure 5:
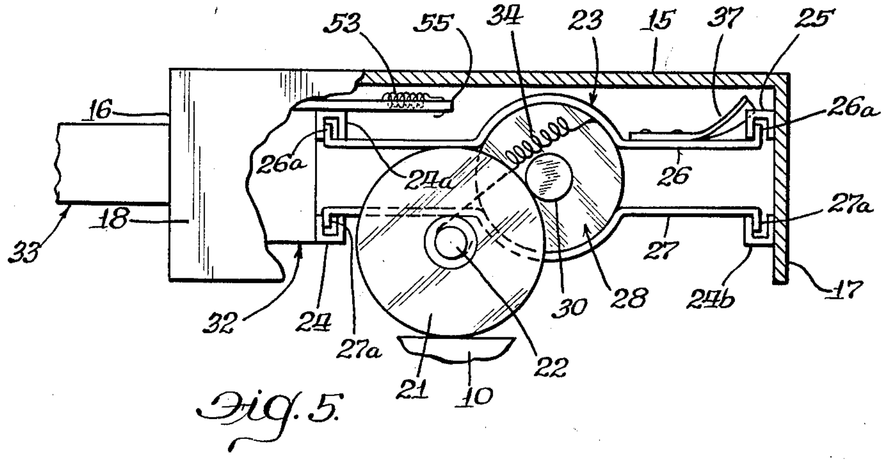
FIGURE 5 is an end elevational view of a structure shown in FIGURE 4 with portions of the outer wall removed.

The various selectively operable control members for the phonograph are contained in the member 48 which in turn is carried beneath the upper wall 15 of the case 14. Those control members include switching means for energizing the audio amplifier and the motor 28, and a volume control for varying the power output of the audio amplifier to the speaker 46. As shown in FIGURE 2 the control members are selectively operated by a knob 50 carried on the upper wall 15 of the case 14 and connected into the member 48. FIGURE 1 shows a control knob 51 of a different or modified design wherein the on and off switching means are separated from the volume control as a centrally disposed and upstanding push button. The control knob 50 or 51 is further positioned substantially on the axis of rotation of the case 14 so that the knob may be easily manually operated while the case 14 is rotating.

The tone arm 33 is pivotally carried at one end thereof by pin means such as pin 52 for rotation about a vertical axis position adjacent to the outwardmost end 18 of the case 14. Although not shown, the tone arm 33 is further pivoted about a horizontal axis to permit the extending end of the tone arm 33 to be lowered to the record 11. The extending end of the tone arm 33 carries any suitable type of phonograph cartridge 33a which will, in engaging the grooves of the record 11, translate the physical variations in those grooves into electrical signals. The direction of rotation of the motor 28 is selected as one which will cause the case 14 to rotate in a direction which will pull the extending end of the tone arm 33 about the surface of the record 11. It is well known in the art that the grooves cut into the record 11 are arranged in the form of a continuous spiral from the outer periphery of the record 11 to a radially inward position in the area of the outer periphery of the base member 12. Thus in operating the phonograph of the subject invention, the tone arm 33 is initially positioned so that the needle of the cartridge thereof engages the beginning portion of the record groove at the outer periphery of the record 11. As the case 14 then rotates to draw the needle of the cartridge of the tone arm 33 along the record groove, the tone arm 33 will be pivoted about the axis of pin means 52 to gradually move toward the side walls 16 of the case 14. To compensate for any centrifugal forces developed in the tone arm 33 by virtue of the rotation of the case 14, a centrifugal force balance spring 53 is provided. One end of the spring 53 is connected to an outwardly extending end of an arm 54. The other end of the arm 54 is fixed to the tone arm 33 at the axis of pin means 52. The other end of the spring 53 is fixed to a bracket 55 which is secured in the case 14. The spring 53 acts to bias the tone arm 33 in a direction opposing the developed centrifugal forces to balance out or cancel those centrifugal forces.

When not in use, the tone arm 33 may be conveniently stored within the space defined by the walled section 32 about the opening through the side wall 16 of the case 14.

Having described the invention what is considered new and desired to be protected by Letters Patent is:

1. In a phonograph arrangement, a stationary substantially horizontal record carrying surface, a phonograph mountable on the center of a record carried on said surface, drive means at one end of said phonograph engaging said surface for rotating said phonograph about a vertical axis through the center of said record, a tone arm carried on said phonograph and engaging said record, said drive means comprising a constant speed motor, and said drive means being adjustable along a line extending radially of the axis of rotation of said phonograph to produce different rotational speeds of said phonograph.

2. In a phonograph arrangement, a stationary substantially horizontal record carrying surface, a phonograph mountable on the center of a record carried on said surface, drive means at one end of said phonograph engaging said surface for rotating said phonograph about a vertical axis through the center of said record, a tone arm carried on said phonograph and engaging said record, said tone arm pivotally carried at one end thereof on said one end of said phonograph for rotation about a substantially vertical axis with said tone arm extending from the trailing side of said phonograph in the rotation thereof.

3. In a phonograph arrangement as defined in claim 2, and spring means connected between said phonograph and said tone arm for cancelling any centrifugal forces developed on said tone arm during the rotation of said phonograph about the axis of rotation thereof.

4. In a phonograph arrangement, a case, a sound reproducing assembly of a power supply, a speaker, an audio amplifier and a phonograph record tone arm carried in said case, a base member positionable on the center of a stationary phonograph record carried on a horizontal surface, pivot means carrying said case on said base member with one end of said case extending beyond the periphery of said record, drive means carried in said case at the extending end of said case and engaging said surface outwardly of the periphery of said record for rotating said case about the axis of said pivot means on said base, and means carrying said tone arm at one end thereof on said extending end of said case with the other end of said tone arm positioned to engage the surface of said record.

5. In a phonograph arrangement as defined in claim 4, wherein said drive means comprises a frame carried in said extending end of said case, a constant speed motor carried on said frame, a drive wheel rotatively carried on said frame and drivingly engaged by said motor, said drive wheel engaging said surface outwardly of the periphery of said record.

6. In a phonograph arrangement as defined in claim 5, wherein said frame is adjustable along a line extending radially of the axis of rotation of said case to produce different rotational speeds of said case.

7. In a phonograph arrangement as defined in claim 4, wherein said tone arm is pivotally carried at one end thereof on said extending end of said case for rotation about a substantially vertical axis with said tone arm extending from the trailing side of said case in the rotation thereof.

8. In a phonograph arrangement as defined in claim 7, and spring means connected between said case and said tone arm for cancelling any centrifugal forces developed on said tone arm during the rotation of said case about the axis of rotation thereof.

9. In a phonograph arrangement as defined in claim 4, a plurality of tracks carried in a parallel spaced apart relationship to each other in said extending end of said case with the longitudinal axes of said tracks positioned parallel to the longitudinal axis of said case, said drive means comprising a drive wheel slidably carried in said plurality of tracks and engaging said surface outwardly of the periphery of said record.

10. In a phonograph arrangement as defined in claim 9, means for indexing said drive wheel in different predetermined longitudinal positions in said tracks corresponding to certain predetermined rotational speeds of said case.

11. In a phonograph arrangement, a substantially elongated case, a base member positionable on the center of a stationary phonograph record carried on a horizontal surface, mounting means for rotatively carrying said case in a spaced relationship above said record, said mounting means being carried between the center of said base member and the underside of said case at a position spaced longitudinally from one end of said case with the other end of said case extending to the periphery of any record carried on said surface, a sound reproducing assembly of a power supply, a speaker, an audio amplifier and a phonograph record tone arm, said power supply and said speaker carried in said one end of said case, means carrying said audio amplifier in said case and about said axis of rotation of said case on said base member, drive means carried in said other end of said case and engageable with said surface outwardly of the periphery of any record carried on said surface for rotating said case about the axis of rotation thereof on said base, and means carrying said tone arm at one end thereof on said other end of said case with the other end of said tone arm positioned outwardly of said case to engage the surface of any record carried on said surface.

12. In a phonograph arrangement as defined in claim 11 wherein said drive means comprises a frame carried in said other end of said case, a constant speed motor carried on said frame, a drive wheel rotatively carried on said frame and drivingly engaged by said motor, said drive wheel engaging said surface outwardly of the periphery of any record carried on said surface.

13. In a phonograph arrangement as defined in claim 11, manually operable control means for controlling the operation of said audio amplifier and said drive means, said manually operable control means carried on the upper surface of said case and concentric to the axis of rotation of said case on said base.

14. In a phonograph arrangement as defined in claim 11, wherein said tone arm extends from the trailing side of said case in the rotation thereof, and spring means connected between said case and said tone arm for biasing said tone arm toward said case to cancel any centrifugal forces developed on said tone arm during the rotation of said case about the axis of rotation thereof.

15. In a phonograph arrangement as defined in claim 11, a plurality of tracks carried in a parallel spaced apart relationship to each other in said other end of said case with the longitudinal axes of said tracks positioned parallel to the longitudinal axis of said case, said drive means comprising a drive wheel slidably carried in said plurality of tracks and engaging said surface outwardly of the periphery of any record carried on said surface for rotating said case about the axis of rotation thereof on said base.

16. In a phonograph arrangement as defined in claim 15, means for indexing said drive wheel in different predetermined longitudinal positions in said tracks corresponding to certain predetermined rotational speeds of said case.

(References on following page)

References Cited by the Examiner

UNITED STATES PATENTS

| | | | |
|---|---|---|---|
| 836,470 | 11/06 | Smith | 247—9 |
| 1,178,840 | 4/16 | Cassard | 274—9 |
| 2,554,919 | 5/51 | Mullaney | 274—9.1 |

FOREIGN PATENTS

| | | |
|---|---|---|
| 980,828 | 5/51 | France. |

NORTON ANSHER, *Primary Examiner.*

EMIL G. ANDERSON, *Examiner.*